(12) United States Patent
Ribble et al.

(10) Patent No.: US 12,460,602 B2
(45) Date of Patent: Nov. 4, 2025

(54) BONDED DOUBLE WALL SEAL ASSEMBLY

(71) Applicant: The Boeing Company, Chicago, IL (US)

(72) Inventors: Jessica Marie-Meyer Ribble, Ridgeville, SC (US); Wesley L. Holman, Ridgeville, SC (US); Stephen R. Byrne, Seattle, WA (US); Amy Everson, Sammamish, WA (US); Huilin Xie, Lynnwood, WA (US); Daniel Freeman, Goose Creek, SC (US); Genesis Marvin S. Pilarca, Seattle, WA (US)

(73) Assignee: The Boeing Company, Alexandria, VA (US)

( * ) Notice: Subject to any disclaimer, the term of this patent is extended or adjusted under 35 U.S.C. 154(b) by 0 days.

(21) Appl. No.: 18/740,759

(22) Filed: Jun. 12, 2024

(65) Prior Publication Data
US 2024/0328371 A1 Oct. 3, 2024

Related U.S. Application Data

(62) Division of application No. 17/379,087, filed on Jul. 19, 2021, now abandoned.

(51) Int. Cl.
*F02K 1/80* (2006.01)
*F02C 7/25* (2006.01)
*F02C 7/28* (2006.01)
*F02K 1/72* (2006.01)
*F02K 1/76* (2006.01)

(52) U.S. Cl.
CPC ............... *F02K 1/805* (2013.01); *F02C 7/25* (2013.01); *F02C 7/28* (2013.01); *F02K 1/72* (2013.01); *F02K 1/763* (2013.01)

(58) Field of Classification Search
CPC ..... F02K 1/805; F02C 7/25; F02C 7/28; F16J 15/027
See application file for complete search history.

(56) References Cited

U.S. PATENT DOCUMENTS

| | | | |
|---|---|---|---|
| 11,746,706 B2 * | 9/2023 | Jacon | F01D 11/003 60/801 |
| 2012/0131928 A1* | 5/2012 | Damgaard | F01D 11/005 29/888 |
| 2012/0195743 A1* | 8/2012 | Walunj | F16J 15/0887 29/700 |
| 2021/0070460 A1* | 3/2021 | Ramlaoui | B64D 29/00 |
| 2021/0095569 A1* | 4/2021 | Jacon | F02K 1/80 |

* cited by examiner

*Primary Examiner* — Andrew H Nguyen
(74) *Attorney, Agent, or Firm* — Joseph M. Butscher; The Small Patent Law Group LLC (57) ABSTRACT

A seal assembly includes a first wall extending from a compression side to a fastened side of the seal assembly, a second wall interior of the first wall and extending from the compression side to the fastened side of the seal assembly, and a stiffening member embedded within the second wall adjacent to the compression side of the seal assembly. When the seal assembly is pressurized, the first wall and the second wall define an insulated pocket.

20 Claims, 7 Drawing Sheets

BONDED DOUBLE WALL SEAL ASSEMBLY

PRIORITY CLAIM

The present application is a divisional application of U.S. patent application Ser. No. 17/379,087 filed on Jul. 19, 2021, the entirety of which is incorporated herein by reference.

INTRODUCTION

The present disclosure relates to a double wall sealing member that may be used as a fire barrier and seal.

A thrust reverser for an aircraft engine often includes a contact or kiss style seal, because, during the opening and closing operation of the thrust reverser, the upper duct member un-kisses from the seal and then kisses back down onto the seal when the operation is completed. Frequently, these seals are designed using a single wall seal that can have difficulties withstanding engine fire environments.

SUMMARY

Embodiments according to the present disclosure provide a number of advantages. For example, embodiments according to the present disclosure include a double walled seal cross-section that ensures the walls do not touch during compression and that includes an internal metal stiffener to reinforce the seal against turning inside out when pressurized.

In one aspect of the present disclosure, a seal assembly includes a first wall extending from a compression side to a fastened side of the seal assembly, a second wall interior of the first wall and extending from the compression side of the seal assembly to the fastened side of the seal assembly, the second wall having an upper portion adjacent to the compression side of the seal assembly and a semi-permeable portion extending from the upper portion to the fastened side of the seal assembly, and a stiffening member embedded within the upper portion of the second wall adjacent to the compression side of the seal assembly. When the seal assembly is pressurized, the first wall forms a first C-shape and the second wall forms a second C-shape interior of the first C-shaped first wall such that the seal assembly has a nested double C-shaped cross-section with respect to a longitudinal axis of the seal assembly and such that the first wall and the second wall define an insulated pocket.

In some aspects, the upper portion has an outer end and an inner end opposite the outer end, wherein the semi-permeable portion is attached to the outer end.

In some aspects, the second wall includes a plurality of perforations such that pressurized air interior of the second wall passes through the second wall to inflate and maintain a pressure within the insulated pocket.

In some aspects, the first wall includes a tapered section such that a width of the first wall increases from the compression side to the fastened side of the seal assembly.

In some aspects, the tapered section of the first wall increases a stiffness of the first wall near the fastened side of the seal assembly.

In some aspects, the first wall is bonded to the second wall at a low stress point adjacent to the fastened side of the seal assembly.

In some aspects, the first wall and the second wall are connected by a rubber bond.

In some aspects, the first wall and the second wall are connected by one or more mechanical fasteners.

In some aspects, the first and second walls of the seal assembly are formed as a unitary piece.

In another aspect of the present disclosure, a thrust reverser assembly for an aircraft engine nacelle includes a cowl mounted to the nacelle and a fire seal assembly coupled with the cowl. The fire seal assembly includes a first wall extending from a compression side to a fastened side of the fire seal assembly, a second wall interior of the first wall and extending from the compression side to the fastened side of the fire seal assembly, the second wall having an upper portion adjacent to the compression side of the seal assembly and a semi-permeable portion extending from the upper portion to the fastened side of the seal assembly, and a stiffening member embedded within the upper portion of the second wall adjacent to the compression side of the fire seal assembly. When the fire seal assembly is pressurized, the first wall forms a first C-shape and the second wall forms a second C-shape interior of the first C-shaped first wall such that the fire seal assembly has a nested double C-shaped cross-section with respect to a longitudinal axis of the fire seal assembly and such that the first wall and the second wall define an insulated pocket.

In some aspects, the upper portion has an outer end and an inner end opposite the outer end, wherein the semi-permeable portion is attached to the outer end.

In some aspects, the second wall includes a plurality of perforations such that when the fire seal assembly is pressurized, pressurized air interior of the second wall passes through the second wall to inflate and maintain a pressure within the insulated pocket.

In some aspects, the first wall includes a tapered section such that a width of the first wall increases from the compression side to the fastened side of the fire seal assembly.

In some aspects, the tapered section of the first wall increases a stiffness of the first wall near the fastened side of the fire seal assembly.

In some aspects, the first wall is bonded to the second wall at a low stress point adjacent to the fastened side of the seal assembly.

In another aspect of the present disclosure, a method for manufacturing a fire seal assembly includes forming an inner wall from a first elastomeric material and forming a plurality of perforations in the inner wall, the inner wall having a first inner wall end and a second inner wall end opposite the first inner wall end, the inner wall having an upper portion adjacent to the first inner wall end and a semi-permeable portion extending from the upper portion to the second inner wall end, embedding a stiffening member within the upper portion of the inner wall adjacent to the first inner wall end of the inner wall, forming an outer wall from a second elastomeric material, the outer wall having a first outer wall end and a second outer wall end opposite the first outer wall end, coupling the inner wall to the outer wall at a first low stress point adjacent to the first inner and outer wall ends and at a second low stress point adjacent to the second inner and outer wall ends, such that the inner wall is interior of the outer wall, and pressurizing the fire seal assembly such that the outer wall forms a first C-shape and the inner wall forms a second C-shape interior of the first C-shaped outer wall such that the fire seal assembly has a nested double C-shaped cross-section with respect to a longitudinal axis of the fire seal assembly and such that an insulated pocket is defined between the inner and outer walls.

In some aspects, during pressurization of the fire seal assembly, the embedded stiffening member prevents inversion of the fire seal assembly such that the fire seal assembly retains the nested double C-shaped cross-section.

In some aspects, the upper portion has an outer end and an inner end opposite the outer end, wherein the semipermeable portion is attached to the outer end.

In some aspects, during pressurization of the fire seal assembly, pressurized air interior of the inner wall passes through the inner wall to inflate and maintain a pressure within the insulated pocket.

In some aspects, the first and second elastomeric materials include an elastomer and a fabric material.

BRIEF DESCRIPTION OF THE DRAWINGS

The present disclosure will be described in conjunction with the following figures, wherein like numerals denote like elements.

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through the use of the accompanying drawings. Any dimensions disclosed in the drawings or elsewhere herein are for the purpose of illustration only.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present disclosure. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Certain terminology may be used in the following description for the purpose of reference only, and thus are not intended to be limiting. For example, terms such as "above" and "below" refer to directions in the drawings to which reference is made. Terms such as "front," "back," "fore," "aft," "left," "right," "rear," and "side" describe the orientation and/or location of portions of the components or elements within a consistent but arbitrary frame of reference which is made clear by reference to the text and the associated drawings describing the components or elements under discussion. Moreover, terms such as "first," "second," "third," and so on may be used to describe separate components. Such terminology may include the words specifically mentioned above, derivatives thereof, and words of similar import.

In various embodiments, including the illustrated embodiments discussed herein, a fire seal includes a double wall (inner wall and outer wall) that defines an air/gas chamber or area to help insulate the cold side of the seal during a fire event. In various embodiments, the seal is part of a thrust reverser assembly for an aircraft engine. In various embodiments, the fire seal has a double C shape configuration, while in some embodiments, the fire seal has a stacked bulb or peanut-shaped configuration. The various embodiments discussed herein include a stiffening member embedded within the seal to improve the seal's rigidity and form when installed. The seals discussed herein are used as a fire seal or barrier in a thrust reverser assembly for an aircraft engine; however, the seals may be used in other fire seal applications. Throughout the various embodiments discussed herein, like reference numbers refer to like components.

Figure 1:
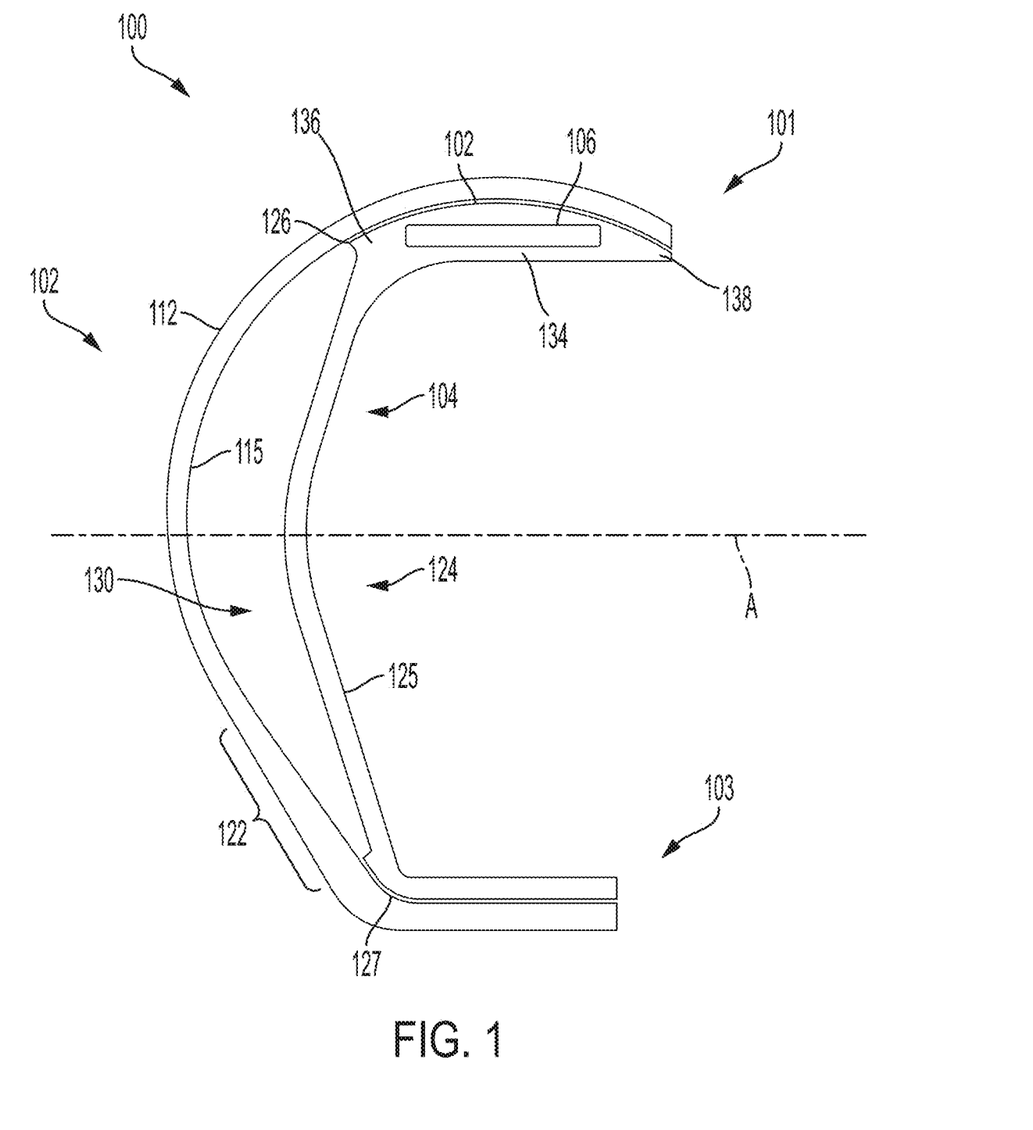
FIG. 1 is a schematic cross-sectional view of a double-walled seal assembly, according to an embodiment.
Figure 2:
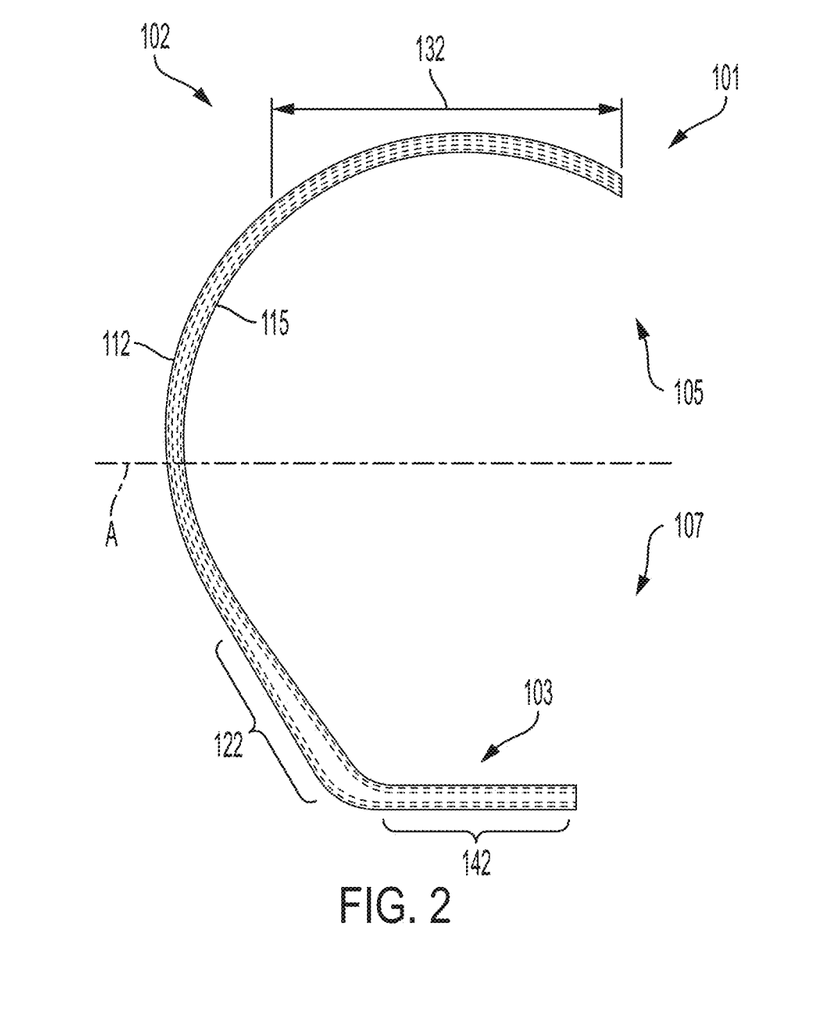
FIG. 2 is a schematic cross-sectional view of an outer wall of the double-walled seal assembly of FIG. 1.
Figure 3:
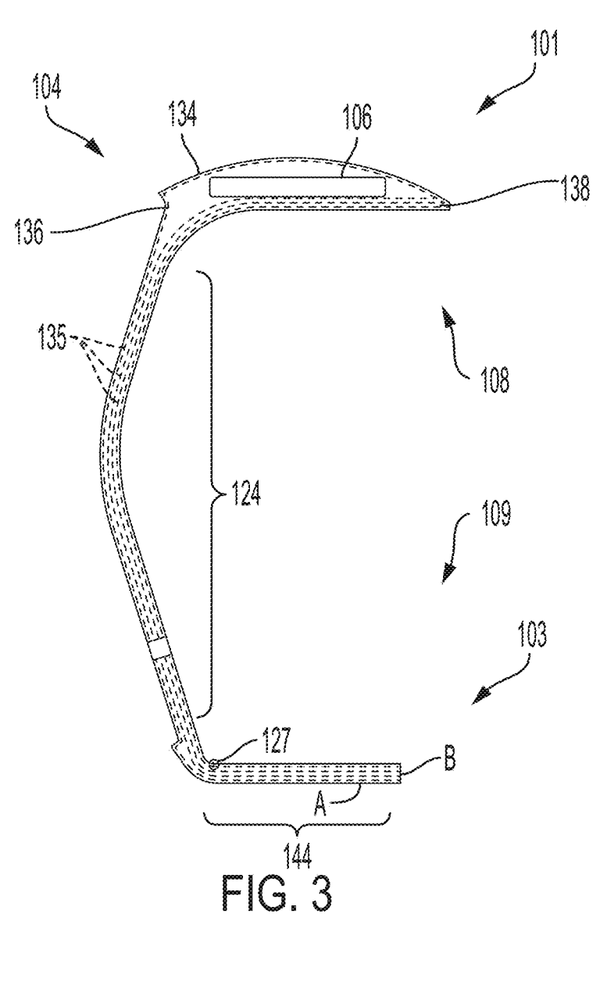
FIG. 3 is a schematic cross-sectional view of an inner wall of the double-walled seal assembly of FIG. 1.

FIGS. 1-3 illustrate a double-walled seal assembly 100 having a double C-shaped cross-section with respect to a longitudinal axis A of the seal assembly 100. The seal assembly 100 has a first end 101 corresponding to an upper side of the C-shaped seal assembly 100 and a second end 103 corresponding to a lower side of the C-shaped seal assembly 100. In various embodiments, the first end 101 is compressed against a duct surface and the second end 103 is fastened to a duct surface when the seal assembly 100 is installed.

The seal assembly 100 includes a first or outer wall 102 and a second or inner wall 104. In the illustrated embodiment, the outer wall 102 is a C-shaped wall having an outer surface 112 that includes a sealing surface 132 (shown in FIG. 2). The sealing surface 132 engages with an interior surface of a duct when the seal assembly 100 is installed, as discussed below. The sealing surface 132 is curved to help the seal assembly 100 to maintain contact with a duct surface during installation when the duct member "kisses" or engages against the sealing surface 132 of the seal assembly 100 during contact when, for example, a thrust reverser is opened. In various embodiments, the outer wall 102 is an impermeable membrane made of an elastomer and fabric construction.

The outer wall 102 also includes a tapered portion 122. The tapered portion 122 extends from a lower end of the curve of the C-shaped outer wall 102 toward the second end 103. Within the tapered portion 122, the outer wall 102 increases in width or thickness toward the second end 103 to increase a stiffness of the seal assembly 100. The outer wall 102 also includes an outer wall fastening portion 142 located at the second end 103 of the seal assembly 100. Additionally, the outer wall 102 has a first outer wall end 105 at the first end 101 of the seal assembly 100 and a second outer wall end 107 at the second end 103 of the seal assembly 100.

With continued reference to FIGS. 1 and 3, the inner wall 104 is a C-shaped wall having an upper portion 134 and a semi-permeable portion 124. The semi-permeable portion 124 includes the curved portion of the inner wall 104 and includes a plurality of perforations 135 spaced throughout the inner wall 104 such that the inner wall 104 is mostly impermeable with small perforations for airflow formed throughout. The upper portion 134 is adjacent to the first end 101, and has an outer end 136 to which the semi-permeable portion 124 is attached and an inner end 138 that is opposite the outer end 136. The upper portion 134 encapsulates a stiffening member 106. The stiffening member 106 extends through the seal assembly 100 to provide rigidity when the seal assembly 100 is pressurized. The inner wall 104 also includes an inner wall fastening portion 144 located at the second end 103 of the seal assembly 100. In various embodiments, the inner wall 104 is a partially permeable membrane made of an elastomer and fabric construction. Additionally, the inner wall 104 has a first inner wall end 108 at the first end 101 of the seal assembly 100 and a second inner wall end 109 at the second end 103 of the seal assembly 100.

The outer and inner walls 102, 104 of the seal assembly 100 meet at a first joining point 126 and a second joining point 127 to define an insulated pocket or chamber 130, as shown in FIG. 1. The first and second joining points 126, 127 are low stress points of the seal assembly 100, that is, areas where, when the seal assembly 100 is pressurized, the pressure forces are lower as compared to other areas of the seal assembly 100. The chamber 130 is an insulated air pocket between the outer and inner walls 102, 104 of the seal assembly 100 that provides an insulative benefit.

The permeable portion 124 of the inner wall 104 includes the plurality of perforations 135 configured to permit transfer of air from an interior side of the inner wall 104 to the chamber 130. The plurality of perforations 135 allow airflow into the chamber 130 which, because an inner surface 125 of the inner wall 104 experiences high pressure when the thrust reverser is closed, high pressure air can egress through the perforations 135 to apply an air pressure load to an interior surface 115 of the outer wall 102 to push the outer wall 102 in an outward direction away from the inner wall 104 to form the reverse C-shaped double wall seal assembly 100 configuration shown in FIG. 1.

The seal assembly 100 illustrated in FIGS. 1-3 is manufactured by separately forming the outer wall 102 and the inner wall 104. The inner wall 104 is formed around the stiffening member 106 such that the stiffening member 106 is embedded within the inner wall 104. The outer and inner walls 102, 104 are then bonded with a rubber bond at the ends of each of the strips of elastomer and fabric material forming the outer and inner walls 102, 104. As shown in FIG. 1, the outer wall 102 is joined with the inner wall 104 at the first joining point 126 and at the second joining point 127. From each of the first and second joining points 126, 127 to the ends of the strips, the outer and inner walls 102, 104 are adjacent and bonded as illustrated.

Figure 4:
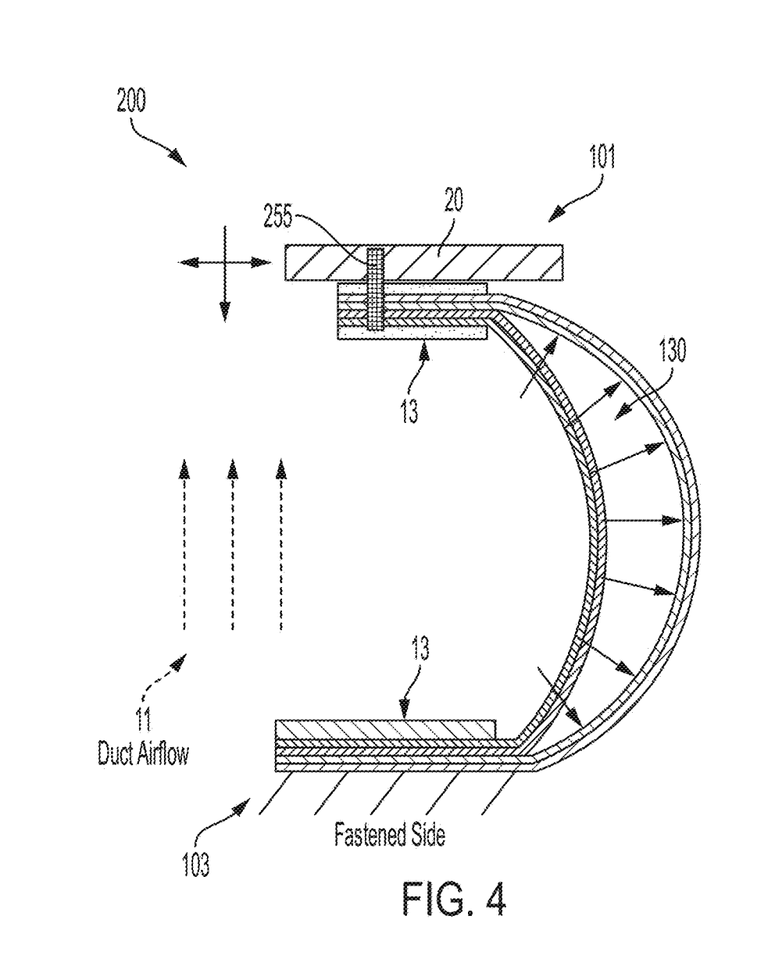
FIG. 4 is a schematic cross-sectional view of a double-walled seal assembly, according to another embodiment.

FIG. 4 illustrates a cross-section of another embodiment of a seal assembly 200 during pressurization. The seal assembly 200 is similar in shape and manufacture to the seal assembly 100; however, the seal assembly 200 is formed from an outer wall 102 and an inner wall 104 that are separately formed and mechanically fastened together at the first end 101 by a mechanical fastener 255. The seal assembly 200 is fastened, such as to a portion of a duct, at the second end 103. The first end 101 of the seal assembly 200 is adjacent to a compression surface 20 against which the seal assembly 200 compresses. Airflow, such as a duct airflow 11, pressurizes the seal assembly 200, as shown by the arrows 13. The pressurizing airflow 13 passes through the perforations in the inner wall 104 to inflate the chamber 130.

Figure 5:
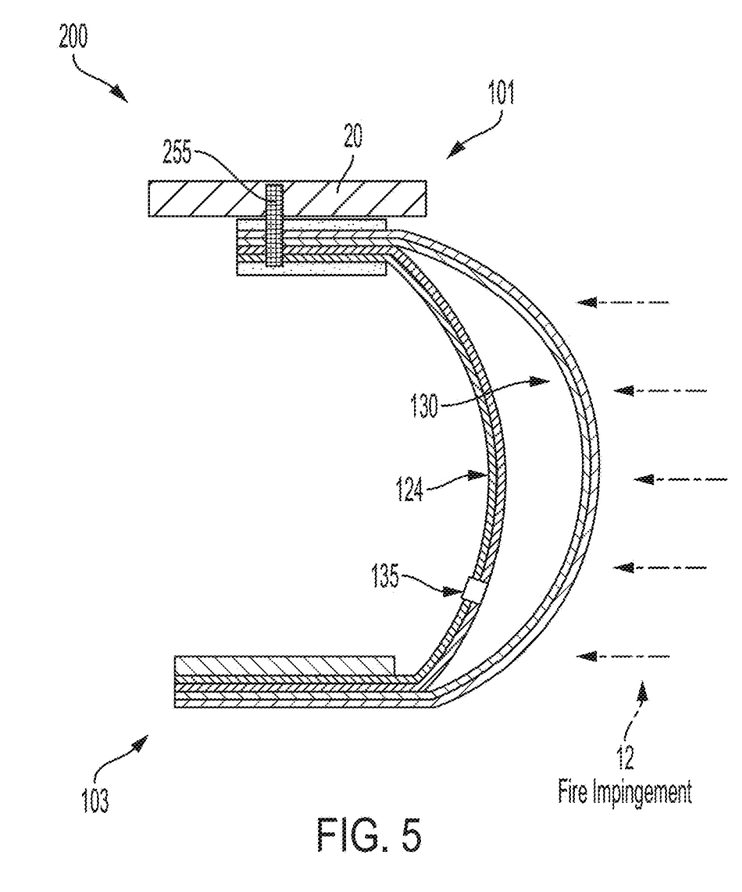
FIG. 5 is a schematic cross-sectional view of the double-walled seal assembly of FIG. 4, illustrating a fire impingement event.

FIG. 5 illustrates a cross-section of the seal assembly 200 during a fire impingement event. In this illustration, the seal assembly 200 is positioned against the compression surface 20 and is fastened at the second end 103. A heat and fire impinge on the outside surface of the outer wall 102, as shown by the arrows 12. Cooling air from the duct passes through the perforations 135 in the inner wall 104 such that the chamber 130 forms an insulative pocket of air.

Figure 6:
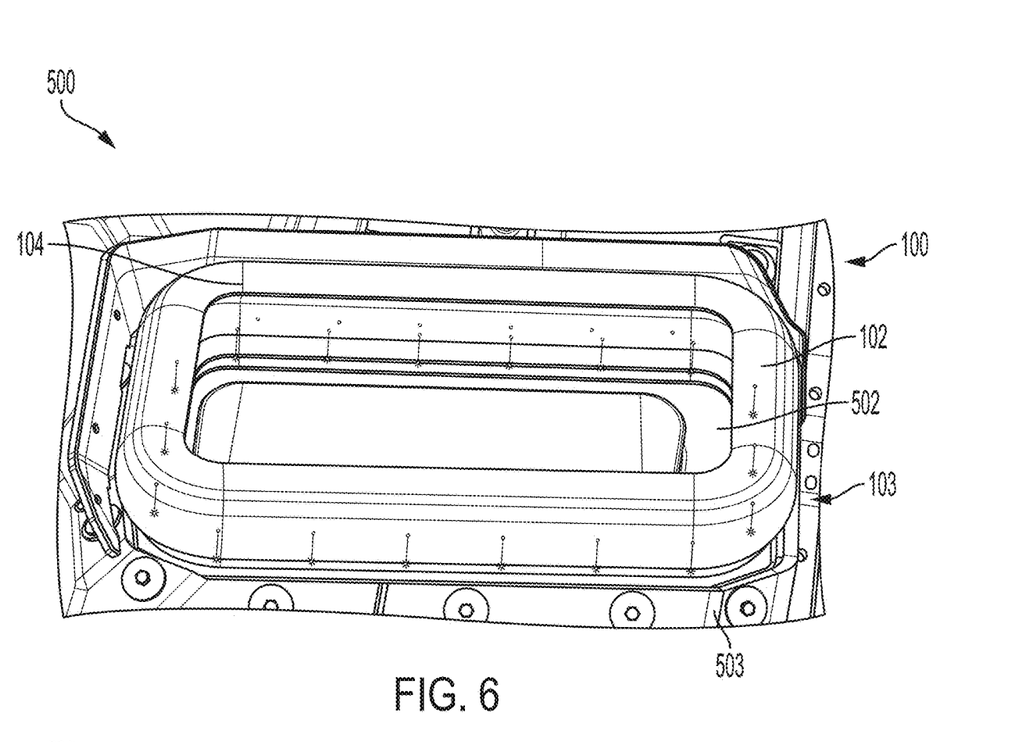
FIG. 6 is a schematic top perspective view of a double-walled seal assembly partially installed in a thrust reverser assembly, according to an embodiment.
Figure 7:
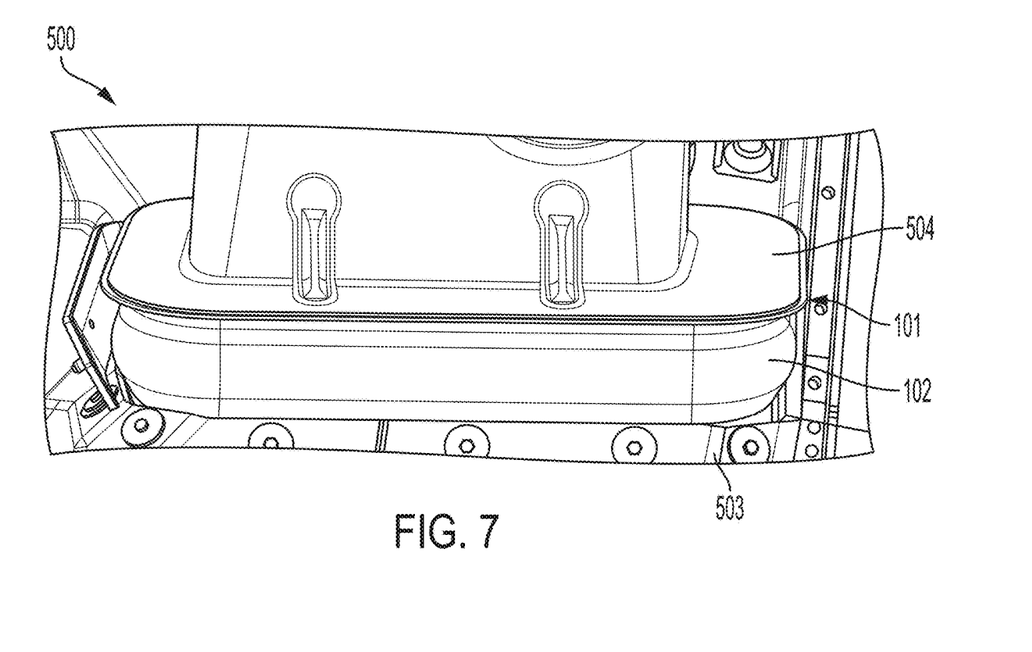
FIG. 7 is a schematic top perspective view of a double-walled seal assembly installed in a thrust reverser assembly, according to an embodiment.

With reference to FIGS. 6 and 7, a seal, such as the seal assemblies 100, 200, is shown as installed in a thrust reverser assembly 500 for an aircraft engine nacelle. As noted herein, the seal assemblies 100, 200 may be used in a thrust reverser assembly or in another application in which a double-walled seal is appropriate and beneficial, such as other fire sealing applications.

The seal assembly 100 is positioned such that the second end 103 is adjacent and fastened to a first duct component 502, such as a cowl, mounted to an engine nacelle 503. The outer wall 102 is shown forming the exterior C-shaped wall while the inner wall 104 is positioned inside and forms the interior C-shaped wall. As shown in FIG. 7, a second duct component 504 is positioned adjacent to the first end 101 of the seal assembly 100. The seal assembly 100 is pressurized such that the first end 101 of the seal assembly 100 compresses against the component 504 to form the fire seal barrier.

Figure 8:
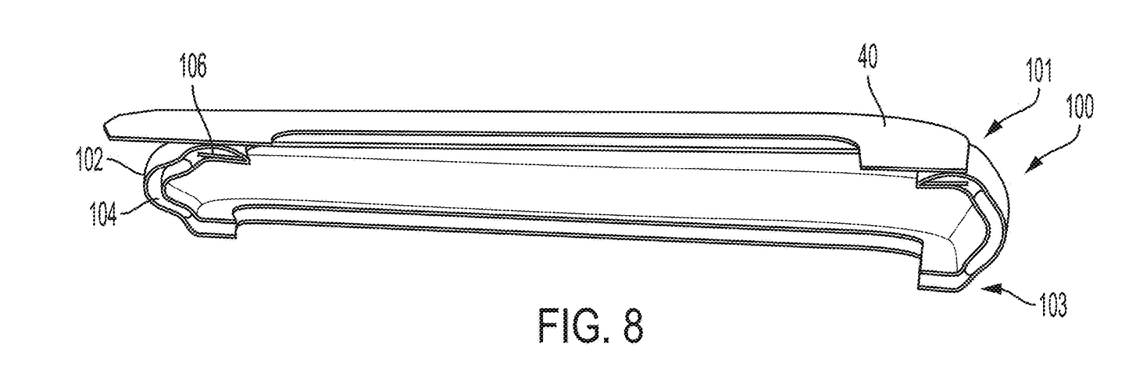
FIG. 8 is a schematic cross-sectional view of a duct including the double-walled seal assembly of FIG. 1.

FIG. 8 is another view of the seal assembly 100 during installation with a duct member 40. Initially, a first side of the seal assembly 100 is inserted against the duct member 40. As shown in FIG. 8, the left side of the seal assembly 100 is compressed against the duct member 40. The left side of the seal assembly 100 illustrates a compressed double C-shape. The second or right side of the seal assembly 100 is then inserted against the duct member 40. Prior to insertion, the right side of the seal assembly 100 illustrates a more expanded double C-shape than the compressed side. The stiffening member 106 prevents the seal assembly 100 from flipping outward when the seal assembly 100 is pressurized. The tapered outer wall 102 and the shape of the outer and inner walls 102, 104 from collapsing when the seal assembly 100 is compressed, as illustrated in greater detail in FIGS. 9 and 10.

Figure 9:
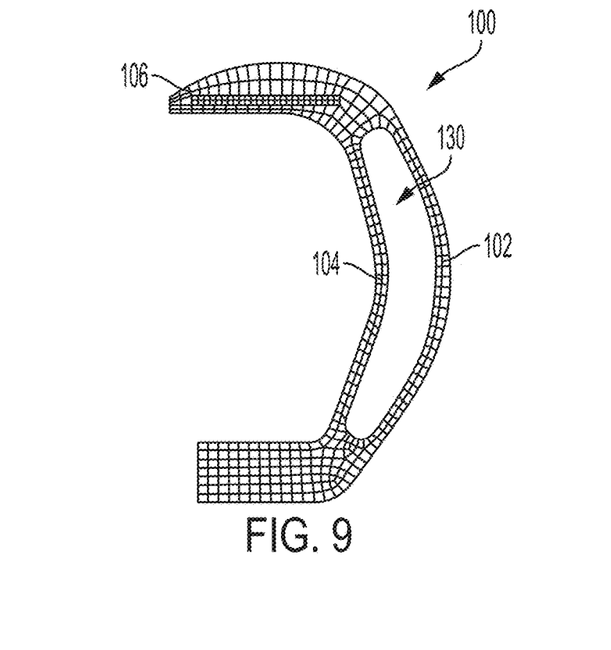
FIG. 9 is a schematic cross-sectional view of the double-walled seal assembly of FIG. 1 in a first, or uncompressed, state.
Figure 10:
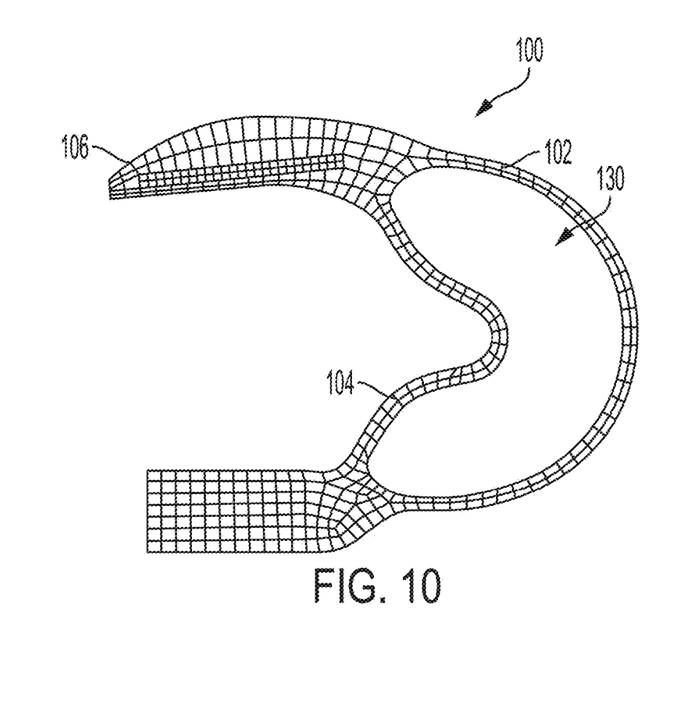
FIG. 10 is a schematic cross-sectional view of the double walled seal assembly of FIG. 1 in a second, or compressed, state.

FIG. 9 illustrates the seal assembly 100 in an uncompressed state while FIG. 10 illustrates the seal assembly 100 in a compressed state. In the uncompressed state, the outer and inner walls 102, 104 form a double C-shape with an elongated chamber 130 separating the outer and inner walls 102, 104. When the seal assembly 100 is compressed, as shown in FIG. 10, the outer and inner walls 102, 104 distort but the overall double walled shape of the seal assembly 100 prevents the inner wall 104 from collapsing into the outer wall 102. As discussed herein, contact between the seal assembly 100 and the duct member can occur in multiple degrees of freedom during touch-down or contact between the duct member and the seal assembly 100. This causes the seal assembly 100 to bend or flex, as shown in FIG. 10, but maintain contact with the duct member. Due to the shape of the upper curve of the sealing surface 132, contact is maintained during operation of the thrust reverser.

Furthermore, during contact between the seal assembly 100 and the duct member, the seal assembly 100 experiences relatively high compression loads. The double C-shaped configuration of the seal assembly 100, along with the stiffening member 106, allow the seal assembly 100 to withstand high compression loads without the outer and inner walls 102, 104 collapsing and contacting each other.

Figure 11:
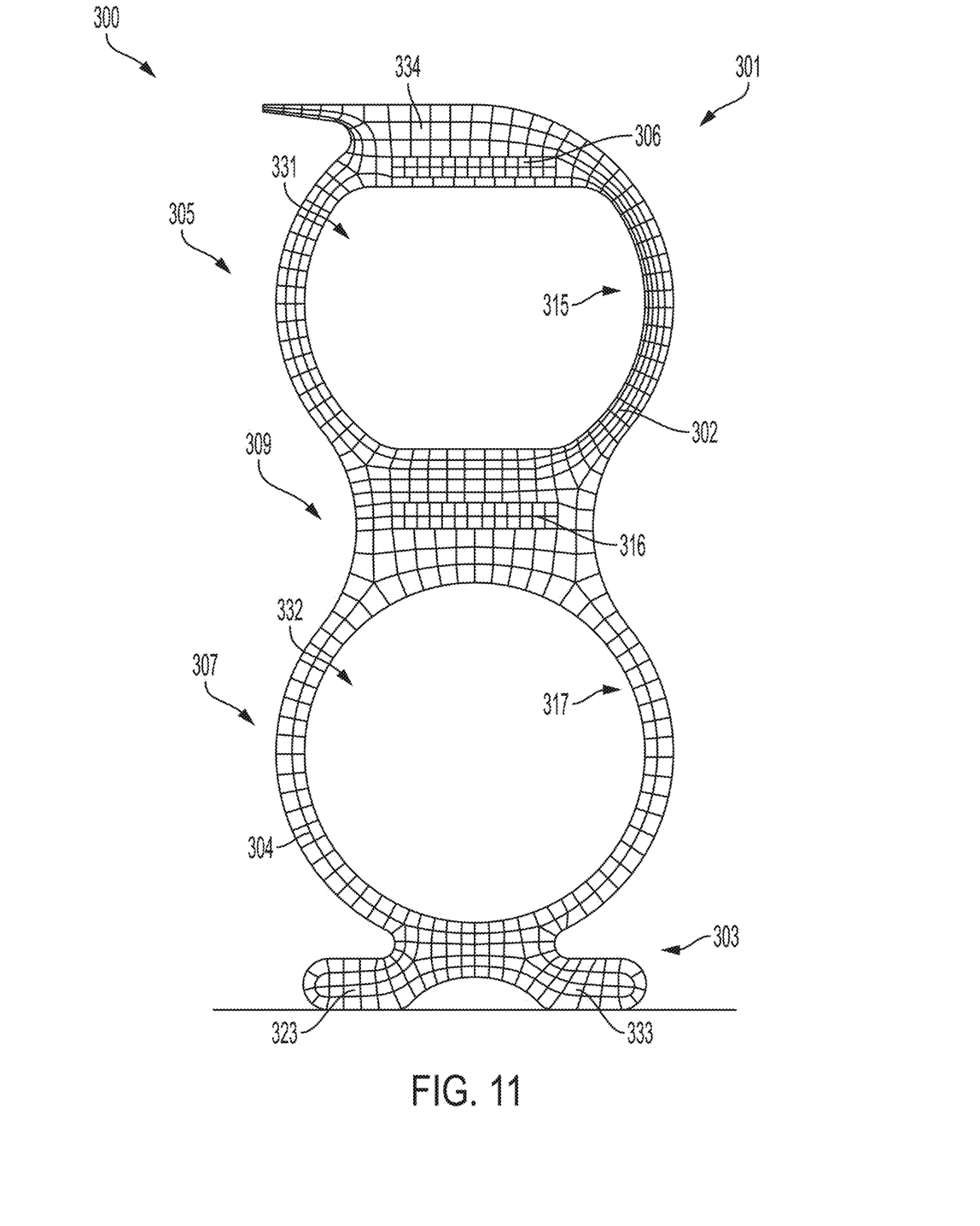
FIG. 11 is a schematic cross-sectional view of double-walled seal assembly, according to another embodiment.

Another embodiment of a seal assembly 300 is shown in FIG. 11. The seal assembly 300 has a stacked bulb or "peanut" shaped configuration extending from a first end 301 to a second end 303. The seal assembly 300 includes a first wall 302 and a second wall 304. The first and second walls 302 are connected at the first end 301, at the second end 303, and in approximately the middle by a connecting portion 309 such that the first and second walls 302, 304 define an upper bulb 305 and a lower bulb 307. Similar to the seal assembly 100, the first end 301 is a compression side of the seal assembly 300 and the second end 303 is a fastened side of the seal assembly 300. An interior surface 315 of the upper wall 302 defines a first chamber 331 and similarly, an interior surface 317 of the lower wall 304 defines a second chamber 332. The first and second chambers 331, 332 are stacked, or vertically aligned, resulting a stacked bulb or "peanut" shaped cross-section of the seal assembly 300.

To provide rigidity and to maintain the general shape of the first and second chambers 331, 332, a first stiffening member 306 is embedded within an upper portion 334 of the seal assembly 300 and a second stiffening member 316 is embedded within the connecting portion 309. In various embodiments, the second end 303 includes a first tab 323 and a second tab 333. The first and second tabs 323, 333 are configured to engage with a duct member during installation of the seal assembly 300 within an assembly, such as a thrust reverser assembly for an aircraft engine.

Figure 12:
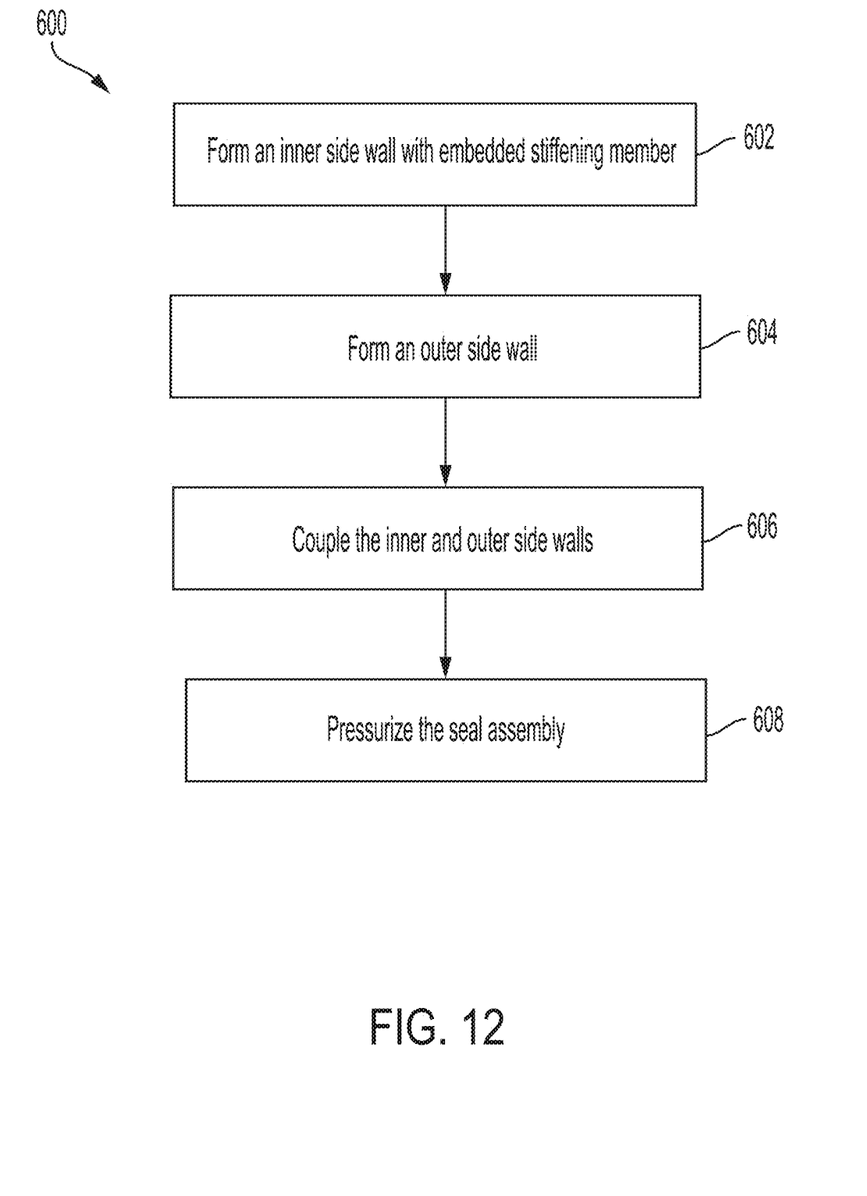
FIG. 12 is a flowchart diagram of a method to manufacture a fire seal assembly, according to an embodiment.

A method 600 to manufacture a fire seal assembly is illustrated as a flowchart in FIG. 12. The method 600 can be utilized in connection with the seal assembly 100 discussed herein. The order of operation of the method 600 is not limited to the sequential execution as illustrated in FIG. 12, but may be performed in one or more varying orders, or steps may be performed simultaneously, as applicable in accordance with the present disclosure.

Beginning at 602, a first strip, forming the inner wall 104 of the seal assembly 100, is formed from an elastomer and fabric material. A plurality of perforations 135 are formed in the inner wall 104 and the stiffening member 106 is embedded within the inner wall 104. Next, at 604, a second strip, forming the outer wall 102 of the seal assembly 100, is formed from an elastomer and fabric material. In various embodiments, the outer wall 102 is formed from the same elastomeric material as the inner wall 104 and in other embodiments, the outer wall 102 is formed from a different elastomeric material. At 606, the outer and inner walls 102, 104 are bonded together at the first and second ends 101, 103 (e.g., at the first joining point 126 adjacent to the first outer and inner wall ends 105, 108, and at the second joining point 127 adjacent to the second outer and inner wall ends 107, 109). In various embodiments, the bonding is a rubber bond, however, in other embodiments, a mechanical fastener is used to couple the first and second ends 101, 103. Finally, at 608, the fire seal assembly is pressurized such that each of the outer and inner walls 102, 104 forms and maintains a curved shape and an insulated pocket is defined between the outer and inner walls 102, 104.

It should be emphasized that many variations and modifications may be made to the herein-described embodiments, the elements of which are to be understood as being among other acceptable examples. All such modifications and variations are intended to be included herein within the scope of this disclosure and protected by the following claims. Moreover, any of the steps described herein can be performed simultaneously or in an order different from the steps as ordered herein. Moreover, as should be apparent, the features and attributes of the specific embodiments disclosed herein may be combined in different ways to form additional embodiments, all of which fall within the scope of the present disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Moreover, the following terminology may have been used herein. The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" or "approximately" means that quantities, dimensions, sizes, formulations, parameters, shapes, and other characteristics need not be exact, but may be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further exemplary aspects of the present disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A seal assembly, comprising:
   a first wall extending from a compression side of the seal assembly to a fastened side of the seal assembly;
   a second wall interior of the first wall and extending from the compression side of the seal assembly to the fastened side of the seal assembly, the second wall having an upper portion adjacent to the compression side of the seal assembly and a semi-permeable portion extending from the upper portion to the fastened side of the seal assembly, wherein the first wall is bonded to the second wall at a low stress point adjacent to the fastened side of the seal assembly; and
   a stiffening member embedded within the upper portion of the second wall adjacent to the compression side of the seal assembly;
   wherein when the seal assembly is pressurized, the first wall forms a first C-shape and the second wall forms a second C-shape interior of the first C-shaped first wall such that the seal assembly has a nested double C-shaped cross-section with respect to a longitudinal axis of the seal assembly and such that the first wall and the second wall define an insulated pocket.

2. The seal assembly of claim 1, wherein the upper portion has an outer end and an inner end opposite the outer end, wherein the semi-permeable portion is attached to the outer end.

3. The seal assembly of claim 1, wherein the second wall includes a plurality of perforations such that pressurized air interior of the second wall passes through the second wall to inflate and maintain a pressure within the insulated pocket.

4. The seal assembly of claim 1, wherein the first wall includes a tapered section such that a width of the first wall increases from the compression side to the fastened side of the seal assembly.

5. The seal assembly of claim 4, wherein the tapered section of the first wall increases a stiffness of the first wall near the fastened side of the seal assembly.

6. The seal assembly of claim 1, wherein the first wall and the second wall are connected by a rubber bond.

7. The seal assembly of claim 1, wherein the first wall and the second wall are connected by one or more mechanical fasteners.

8. The seal assembly of claim 1, wherein the semi-permeable portion includes a plurality of perforations spaced throughout the second wall.

9. A thrust reverser assembly for an aircraft engine nacelle, comprising:
   a cowl mounted to the nacelle; and
   a fire seal assembly coupled with the cowl, the fire seal assembly comprising:
      a first wall extending from a compression side of the fire seal assembly to a fastened side of the fire seal assembly;
      a second wall interior of the first wall and extending from the compression side to the fastened side of the seal assembly, the second wall having an upper portion adjacent to the compression side of the seal assembly and a semi-permeable portion extending from the upper portion to the fastened side of the seal assembly, wherein the first wall is bonded to the second wall at a low stress point adjacent to the fastened side of the seal assembly; and
      a stiffening member embedded within the upper portion of the second wall adjacent to the compression side of the fire seal assembly;
      wherein when the fire seal assembly is pressurized, the first wall forms a first C-shape and the second wall forms a second C-shape interior of the first C-shaped first wall such that the seal assembly has a nested double C-shaped cross-section with respect to a longitudinal axis of the seal assembly and such that the first wall and the second wall define an insulated pocket.

10. The thrust reverser assembly of claim 9, wherein the upper portion has an outer end and an inner end opposite the outer end, wherein the semi-permeable portion is attached to the outer end.

11. The thrust reverser assembly of claim 9, wherein the second wall includes a plurality of perforations such that when the fire seal assembly is pressurized, pressurized air interior of the second wall passes through the second wall to inflate and maintain a pressure within the insulated pocket.

12. The thrust reverser assembly of claim 9, wherein the first wall includes a tapered section such that a width of the first wall increases from the compression side to the fastened side of the fire seal assembly.

13. The thrust reverser assembly of claim 12, wherein the tapered section of the first wall increases a stiffness of the first wall near the fastened side of the fire seal assembly.

14. A method for manufacturing a seal assembly, the seal assembly comprising:
   a first wall extending from a compression side of the seal assembly to a fastened side of the seal assembly;
   a second wall interior of the first wall and extending from the compression side of the seal assembly to the fastened side of the seal assembly, the second wall having an upper portion adjacent to the compression side of the seal assembly and a semi-permeable portion extending from the upper portion to the fastened side of the seal assembly, wherein the first wall is bonded to the second wall at a low stress point adjacent to the fastened side of the seal assembly; and
   a stiffening member embedded within the upper portion of the second wall adjacent to the compression side of the seal assembly;
   wherein when the seal assembly is pressurized, the first wall forms a first C-shape and the second wall forms a second C-shape interior of the first C-shaped first wall such that the seal assembly has a nested double C-shaped cross-section with respect to a longitudinal axis of the seal assembly and such that the first wall and the second wall define an insulated pocket,
   the method comprising:
   forming the second wall from a first elastomeric material and forming a plurality of perforations in the second wall, the second wall having a first inner wall end and a second inner wall end opposite the first inner wall end, the second wall having the upper portion adjacent to the first inner wall end and the semi-permeable portion extending from the upper portion to the second inner wall end;
   embedding the stiffening member within the upper portion of the second wall adjacent to the first inner wall end of the second wall;

forming the first wall from a second elastomeric material, the first wall having a first outer wall end and a second outer wall end opposite the first outer wall end;

coupling the second wall to the first wall at a first low stress point adjacent to the first inner and outer wall ends and at a second low stress point adjacent to the second inner and outer wall ends, such that the second wall is interior of the first wall; and pressurizing the seal assembly such that the first wall forms the first C-shape and the second wall forms the second C-shape interior of the first C-shaped outer wall such that the seal assembly has the nested double C-shaped cross-section with respect to the longitudinal axis of the seal assembly and such that the insulated pocket is defined between the second wall and the first wall.

15. The method of claim 14, wherein during pressurization of the seal assembly, the embedded stiffening member prevents inversion of the seal assembly such that the seal assembly retains the nested double C-shaped cross-section.

16. The method of claim 14, wherein the upper portion has an outer end and an inner end opposite the outer end, wherein the semi-permeable portion is attached to the outer end.

17. The method of claim 14, wherein during pressurization of the seal assembly, pressurized air interior of the second wall passes through the second wall to inflate and maintain a pressure within the insulated pocket.

18. The method of claim 14, wherein the first and second elastomeric materials include an elastomer and a fabric material.

19. The method of claim 14, wherein the semi-permeable portion includes the plurality of perforations spaced throughout the second wall.

20. A seal assembly, comprising:

a first wall extending from a compression side of the seal assembly to a fastened side of the seal assembly;

a second wall interior of the first wall and extending from the compression side of the seal assembly to the fastened side of the seal assembly, the second wall having an upper portion adjacent to the compression side of the seal assembly and a semi-permeable portion extending from the upper portion to the fastened side of the seal assembly, wherein the first wall and the second wall of the seal assembly are formed as a unitary piece; and a stiffening member embedded within the upper portion of the second wall adjacent to the compression side of the seal assembly;

wherein when the seal assembly is pressurized, the first wall forms a first C-shape and the second wall forms a second C-shape interior of the first C-shaped first wall such that the seal assembly has a nested double C-shaped cross-section with respect to a longitudinal axis of the seal assembly and such that the first wall and the second wall define an insulated pocket.

* * * * *